United States Patent [19]

Spaargaren

[11] Patent Number: 4,502,574

[45] Date of Patent: Mar. 5, 1985

[54] ADJUSTER ASSEMBLY FOR A NONSERVO DRUM BRAKE

[75] Inventor: Robert Spaargaren, Granger, Ind.

[73] Assignee: The Bendix Corporation, Southfield, Mich.

[21] Appl. No.: 410,240

[22] Filed: Aug. 23, 1982

[51] Int. Cl.³ .............................................. F16D 65/56
[52] U.S. Cl. ........................ 188/79.5 P; 188/196 BA
[58] Field of Search ............... 188/79.5 P, 79.5 GE, 188/196 BA

[56] References Cited

U.S. PATENT DOCUMENTS

| | | | |
|---|---|---|---|
| 4,139,083 | 2/1979 | Hoshino et al. | 188/79.5 P |
| 4,161,999 | 7/1979 | Camph | 188/79.5 GE |
| 4,220,227 | 9/1980 | Kluger | 188/79.5 P |

FOREIGN PATENT DOCUMENTS

| | | | |
|---|---|---|---|
| 2519613 | 6/1976 | Fed. Rep. of Germany | 188/196 BA |
| 1402527 | 8/1975 | United Kingdom | 188/79.5 GE |

*Primary Examiner*—Duane A. Reger
*Assistant Examiner*—Michael P. Gilday
*Attorney, Agent, or Firm*—Ken C. Decker

[57] ABSTRACT

An adjuster assembly for a nonservo drum brake includes a pawl (44) cooperating with a star wheel (30) of an extendible strut (22). The pawl (44) includes more than one (56, 58) edge cooperating with the star wheel to control extension of the extendible strut (22).

4 Claims, 5 Drawing Figures

ADJUSTER ASSEMBLY FOR A NONSERVO DRUM BRAKE

This invention relates to an adjuster for a nonservo drum brake.

An adjuster assembly for a nonservo drum brake wherein a pair of brake shoes are moved by a hydraulic actuator during braking to pivot about an anchor into engagement with a drum, the adjuster assembly including an extendible strut engaging the pair of brake shoes to substantially define a nonbraking position, a pawl pivotally carried by one of the pair of brake shoes, a spring extending between the other brake shoe and the pawl, the spring and the pawl cooperating with a star wheel on the extendible strut to control extension of the latter in response to a clearance between the pair of brake shoes and the drum.

In U.S. Pat. No. 4,220,227, a nonservo drum brake includes an automatic adjuster assembly with a single spring engaging a pawl to bias the latter to a rest position. The pawl is engageable with a star wheel to control extension of an extendible strut thereby accommodating for lining wear to maintain the pair of brake shoes adjacent the drum. The pawl is pivoted during braking to rotate the star wheel thereby extending the strut to maintain a running clearance between the pair of brake shoes and the drum. Since the extension of the strut is controlled by the rotation of the star wheel, it is important to control rotation of the star wheel so that the brake shoes are not overadjusted into engagement with the drum.

Similar nonservo drum brakes are illustrated in U.S. Pat. Nos. 4,222,467; 4,223,765 and 4,101,011.

The present invention is characterized by said pawl including more than one edge engageable with said star wheel to control rotation thereof.

It is an advantage of the present invention that the pawl cooperates with the star wheel in a limited fashion when the clearance results from normal lining wear.

The invention will now proceed with reference to the accompanying drawings wherein.

Figure 1:
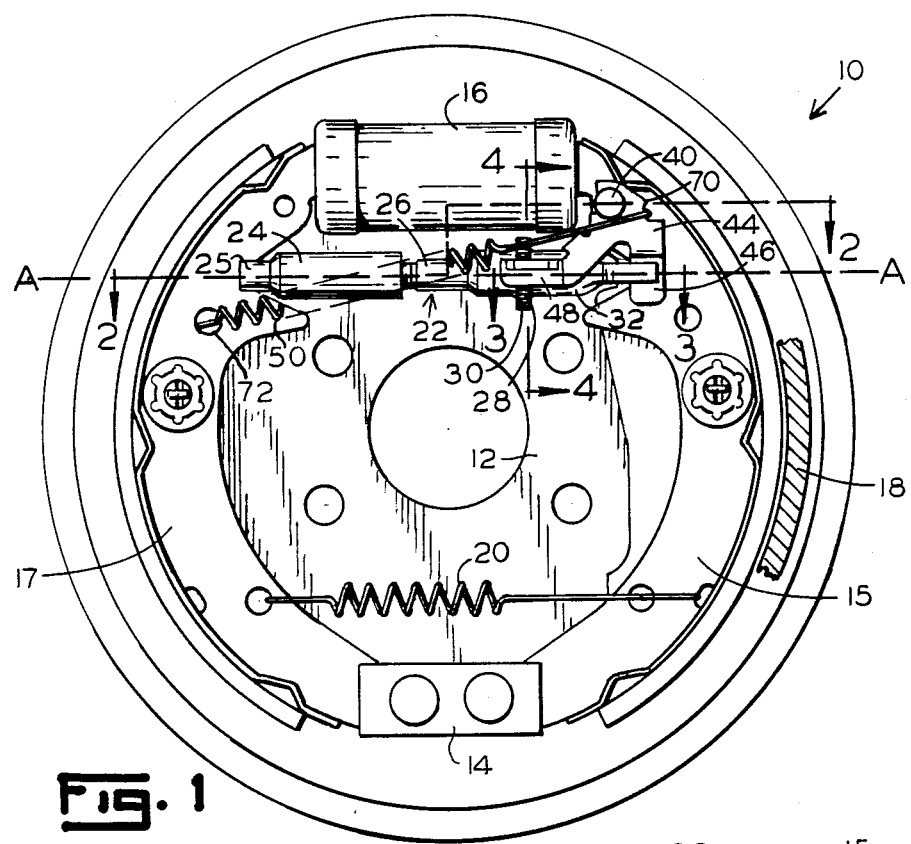
FIG. 1 is a front view of a nonservo drum brake assembly including an adjuster assembly according to the present invention.
Figure 2:
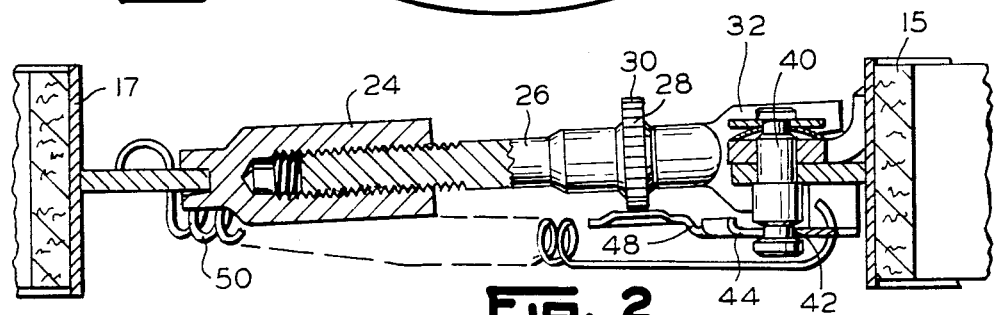
FIG. 2 is an enlarged top view of the adjuster assembly shown in FIG. 1 taken along line 2—2.

A nonservo drum brake 10 includes a backing plate 12 which supports an anchor 14 and a wheel cylinder 16. A pair of brake shoes 15 and 17 are movably carried by the backing plate 12 via holddown springs so that the pair of brake shoes are movable by the wheel cylinder 16 to pivot about the anchor 14 into engagement with a drum 18. A return spring 20 maintains the pair of brake shoes in engagement with the anchor 14.

In order to define a rest position for the pair of brake shoes, an extendible strut 22 is disposed between the pair of brake shoes adjacent the wheel cylinder 16. The extendible strut 22 comprises a cylindrical nut 24 with a slotted end 25 engaging brake shoe 17, a threaded stem 26 cooperating with the cylindrical nut 24 and including a star wheel 28 with teeth 30, and a socket 32 receiving the threaded stem within a blind bore 34 and engaging brake shoe 15 via a slotted end 36. The brake shoe 15 carries a pin 40 with a recess 42 for receiving a pawl 44. The pawl includes a leg 46 extending into the slot 36 and an arm 48 cooperating with the star wheel as explained hereinafter. A retraction spring 50 extends between the brake shoe 17 and the pawl 44 to bias the extendible strut via leg 46 into abutment with the brake shoe 17 and also bias the brake shoe 15 into abutment with the extendible strut. The operation of the spring 50 is more fully described in the foregoing U.S. Pat. No. 4,101,011, issued to Richard T. Burnett on July 18, 1978.

Figures 3, 4, 5:
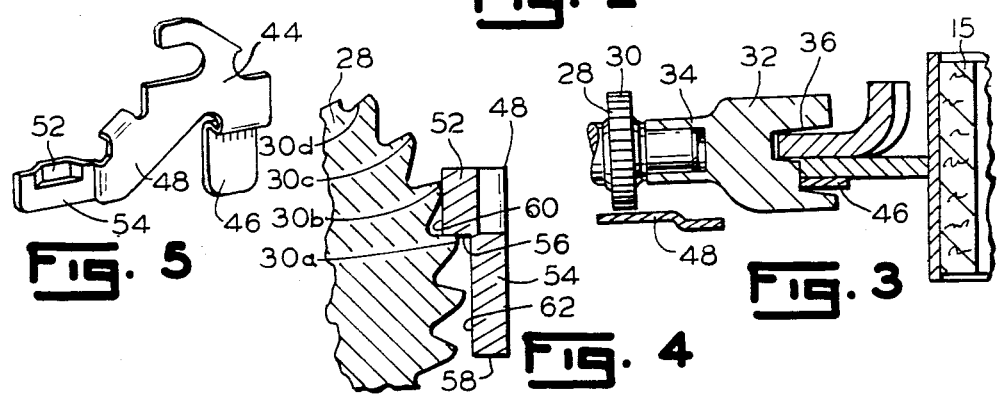
FIG. 3 is an enlarged cross-sectional view taken along line 3—3 of FIG. 1.
FIG. 4 is an enlarged cross-sectional view taken along line 4—4 of FIG. 1.
FIG. 5 is a perspective view of the pawl.

In accordance with the invention, the pawl arm 48 is provided with an offset portion 52 and a flat portion 54, see FIG. 4. The offset portion 52 defines a first edge 56 and the flat portion 54 defines a second edge 58. In the rest position shown in FIG. 4, the first edge 56 is opposing a tooth 30a and an offset surface 60 in engaging the successive tooth 30b. The flat portion 54 defines a flat surface 62 which is spaced from the teeth 30 in the rest position. The verticle length of the flat portion 54 is larger than the verticle length of the offset portion 52.

The extendible strut 22 defines a horizontal plane A—A between the pair of brake shoes. The retraction spring 50 engages the pawl 44 at a recess 70 adjacent the pin 40 and also engages the brake shoe 17 at opening 72. The recess 70 is above the horizontal plane A—A and the opening 72 is below the horizontal plane so that the retraction spring 50 intersects the plane at the cylindrical nut 24. In addition the cylindrical nut 24 intersects a straight line connection between the recess 70 and the opening 72 so that the retraction spring is bent around the cylindrical nut 24 to bias the latter axially toward the backing plate 12. The resulting force of the retraction spring against the cylindrical nut maintains the extendible assembly in contact with the brake shoes 15 and 17 to reduce rattling with the shoe 15, primarily during braking when the spacer moves away from the shoe 15.

During braking, fluid pressure is communicated to the wheel cylinder to pivot the pair of brake shoes radially outward about the anchor 14 until the pair of brake shoes contact the drum 18. Torque developed in retarding rotation of the drum is absorbed by the anchor 14. With the brake shoe 15 moving to the right adjacent the wheel cylinder 16 and the brake shoe 17 moving to the left adjacent the wheel cylinder, the extendible strut is moved to the left with the brake shoe 17. The retraction spring 50 biases the leg 46 to move to the left with the extendible strut and the pin 40 moves the pawl 44 to the right with the brake shoe 15. Consequently, the pawl 44 is rotated clockwise in FIG. 1 so that the arm 48 is moved upwardly. If the lining wear is normal for the pair of brake shoes so that a predetermined running clearance is exceeded slightly, the pawl leg 48 will move upward viewing FIG. 4 until the first edge 56 passes the tooth 30b whereupon the retraction spring 50 moves the first edge 56 to the left in FIG. 4 opposing the tooth 30b. At this time, the flat surface 62 engages the tooth 30a so that the leg and first edge 56 can not move further to the left to pick up any more teeth when the leg is moved further upward. If the clearance between the pair of brake shoes and the drum is excessive, such as when the drum is turned and the brake shoes are new, it is possible for the second edge 58 to continue moving upward past tooth 30a so that the second edge 58 picks up tooth 30a to rotate the latter clockwise in FIG. 4 and the first edge 56 will remain spaced from tooth 30d until the latter is rotated clockwise to the position shown for tooth 30c upon termination of braking. The extended flat surface 62 opposes the star wheel even when the first edge 56 is moved upward in FIG. 4 above tooth 30d, so that the pawl arm 48 will not be moved to the left of the center for the star wheel 28 in FIG. 4 by the force of spring 50.

When braking is terminated, the fluid pressure in the wheel cylinder is relieved so that the retraction spring 50 biases the pawl 44 to pivot about the socket 32 counterclockwise in FIG. 1, thereby moving the brake shoe 15 away from the drum. At the same time, the retraction spring 50 is biasing the extendible strut 22 and the brake shoe 17 to move to the right away from the drum 18. When the pair of brake shoes take up any spacing with the extendible strut, the brake shoes will be returned to their rest position. From this, it follows that the rest position of the pair of brake shoes is adjusted as the star wheel is rotated. As the brake shoes wear during braking, the rest position for the brake shoes is moved outward by the extendible strut to maintain a predetermined running clearance with the drum.

I claim:

1. An adjuster assembly for a nonservo drum brake wherein a pair of brake shoes are moved by a hydraulic actuator during braking to pivot about an anchor into engagement with a drum, the adjuster assembly including an extendible strut engaging the pair of brake shoes to substantially define a nonbraking position, a pawl pivotally carried by one of the pair of brake shoes, a spring extending between the other brake shoe and the pawl, the spring and the pawl cooperating with a star wheel on the extendible strut to control extension of the latter in response to a clearance between the pair of brake shoes and the drum, the star wheel including a plurality of teeth, characterized by said pawl including an arm extending substantially parallel to said extendible strut when braking is terminated, said arm including an offset portion in the direction of said star wheel in order to form a first edge normally cooperating with said plurality of teeth when the clearance results from brake shoe wear, said arm including a flat portion defining a second edge normally spaced from said plurality of teeth, said second edge being engageable with said plurality of teeth when the clearance is excessive, said arm defining a flat surface extending from said second edge to said first edge, said flat surface being engageable with said plurality of teeth when said arm is moved relative to said star wheel during braking and said first edge is indexed from one tooth to a successive tooth, said flat surface permitting said first edge to oppose said successive tooth while said flat surface is engaged with said one tooth, and said flat surface substantially prevents said first edge from engaging a tooth past said successive tooth even though said first tooth is indexed past said successive tooth.

2. The adjuster assembly of claim 1 in which said extendible strut is disposed in a substantially horizontal plane between said pair of brake shoes and said spring extends from said other brake shoes on one side of said horizontal plane to said pawl on an opposite side of said horizontal plane to intersect said horizontal plane.

3. The adjuster assembly of claim 2 in which said spring is engageable with said extendible strut to resiliently bias the latter at all times to an anti rattle position engaging said pair of brake shoes.

4. The adjuster assembly of claim 1 in which said flat surface includes a dimension in a vertical direction from the anchor to the hydraulic actuator which is about twice the length for a similar dimension for said offset portion.

* * * * *